United States Patent [19]
Malen et al.

[11] 3,872,102
[45] Mar. 18, 1975

[54] TRICYCLIC COMPOUNDS OF ALIPHATIC W-AMINO ALCOHOLS

[75] Inventors: Charles Malen, Fresnes; Monique Desnos, Issy-Les-Mouleneaux; Jean-Claude Poignani, Wissous, all of France

[73] Assignee: Societe en nom collectif Science Union et Cie, Societe Francais de Recherche Medicale, Suresnes, France

[22] Filed: Nov. 2, 1971

[21] Appl. No.: 195,036

[30] Foreign Application Priority Data
Nov. 4, 1971 United Kingdom........... 52469/71

[52] U.S. Cl............. 260/327 B, 260/333, 260/573, 424/275, 424/278, 424/330
[51] Int. Cl........................................ C07d 93/42
[58] Field of Search... 260/327 B, 333, 573, 240 TC

[56] References Cited
UNITED STATES PATENTS
| | | | |
|---|---|---|---|
| 3,438,981 | 4/1969 | Stach et al. | 260/240 |
| 3,509,176 | 4/1970 | Winter et al. | 260/333 |
| 3,542,790 | 11/1970 | Weber et al. | 260/293.4 |
| 3,657,276 | 4/1972 | Malen et al. | 260/327 |

FOREIGN PATENTS OR APPLICATIONS
1,028,233   5/1966   United Kingdom............ 260/573

*Primary Examiner*—Henry R. Jiles
*Assistant Examiner*—C. M. S. Jaisle
*Attorney, Agent, or Firm*—Gordon W. Hueschen

[57] ABSTRACT

Tricyclic compounds of aliphatic ω-amino alcohols of the formula

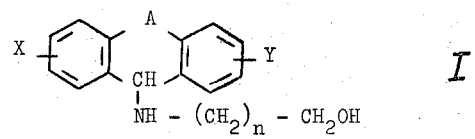

wherein:
A is $-(CH_2)_m-$, $-CH=CH-$, $-(CH_2)_p-O-$, $-(CH_2)_p-S$ or $-SO_2-NR-$ in which $m$ is 1, 2 or 3, $p$ is 1 or 2 and R is lower alkyl;
n is an integer of from 3 to 10 inclusive, and
X and Y are hydrogen or halogen.

These compounds possess psychostimulant, antidepressant and analgesic properties.

7 Claims, No Drawings

TRICYCLIC COMPOUNDS OF ALIPHATIC W-AMINO ALCOHOLS

The present invention provides tricyclic compounds of aliphatic ω-amino alcohols of the general formula I wherein
A is a bridge selected from the following radicals:
$-(CH_2)_m-$, $-CH=CH-$, $-(CH_2)_p-O-$, $-(CH_2)_p-S-$ and $-SO_2-NR-$ in which:
m is an integer of from 1 to 3 inclusive,
p is an integer selected from 1 and 2, and
R is a lower alkyl radical containing from 10 to 5 carbon atoms inclusive;
n is an integer of from 3 to 10 inclusive, and
X and Y are the same or different and each is selected from the group consisting of a hydrogen atom and a halogen atom.

In the general formula I, illustrative alkyl radicals are methyl, ethyl, propyl, isopropyl, butyl, isobutyl, sec.-butyl, tert.-butyl and the pentyls and illustrative halogen atoms are fluorine, chlorine and bromine.

The compounds of the present invention are new and are prepared by condensing a halo compound of the general formula II:

wherein A, X and Y have the meanings given above and Hal represents a chlorine or bromine atom, with an aliphatic ω-amino alcohol of the general formula III:

$NH_2-(CH_2)_n-CH_2OH$     III wherein n has the meaning given above.

The condensation is preferably carried out in a suitable organic solvent, for example, nitromethane, acetonitrile or dimethylformamide, in the presence of an acceptor of the hydrohalic acid formed during the reaction. This acceptor may be, for example an excess of the ω-amino alcohol III, a tertiary amine, a pyridine base, or an alkali metal or alkaline earth metal carbonate or bicarbonate. The reaction is generally slightly exothermic and is preferably carried out at a temperature within the range of from 20° to 100° C.

The halo compounds II used as starting materials may be prepared by methods which are in themselves known, for example by starting from the corresponding hydroxylated compounds which are either treated with dry hydrochloric acid or with thionyl chloride. These hydroxylated compounds themselves may be prepared from the corresponding ketones.

The compounds of the general formula I are bases which yield salts with inorganic or organic acids, for example, hydrochloric, hydrobromic, sulphuric, phosphoric, acetic, propionic, maleic, fumaric, methane sulphonic, tartaric, citric, oxalic and benzoic acid. All these salts are included in the present invention.

Furthermore, the compounds of the general formula I wherein X and Y are not the same and those wherein A is an asymetric bridge may exist in the form of optical isomers and although in this Specification reference is made to the single formula I, it is to be understood that, where they exist, all of the optical isomers are included within the scope of the present invention.

The following Examples illustrate the invention, the melting points being determined on a Kofler block. They are in fact decomposition points, the determination of which is rather imprecise.

EXAMPLE 1

7-[dibenzo (a,d) cycloheptadien-5-yl] aminoheptanol

A solution of 30.6 g (0.133 mol) of 5-chloro-dibenzo (a,d) cycloheptadiene in 300 ml of nitromethane was added to a tepid solution of 35 g (0.267 mol) of 7-amino-heptanol in 30 ml of nitromethane, whilst stirring. The reaction was slightly exothermic and 7-aminoheptanol hydrochloride precipitated out.

The reaction mixture was left to stand overnight, then filtered off. The filtrate was evaporated to dryness in vacuo. The residue was taken up in water and ether. The organic phase was decanted off, washed to neutrality, dried over sodium sulphate, and evaporated in vacuo.

35 g of crude 7-[dibenzo (a,d) cycloheptadien-5-yl] aminoheptanol were obtained, in which the content of pure product determined by titration with perchloric acid is 95 %.

This crude base, treated with a solution of hydrochloric gas in ether, then recrystallized from water, yields 23.4 g of 7-[dibenzo (a,d) cycloheptadien-5-yl] aminoheptanol hydrochloride, melting instantaneously at 210° C, with decomposition.

EXAMPLES 2–6

The following derivatives were prepared according to the method described in Example 1.

2. 4-[dibenzo (a,d) cycloheptadien-5-yl] aminobutanol, M.P. of its hydrochloride 185° C inst., starting from 5-chloro-dibenzo (a,d) cycloheptadiene and 4-aminobutanol.
3. 5-[dibenzo (a,d) cycloheptadien-5-yl] aminopentanol, B.P./0.05 mm Hg : 168°–170° C, n$_{22}^D$: 1.5836, starting from 5-chloro-dibenzo (a,d) cycloheptadiene and 5-aminopentanol.
4. 11-[dibenzo (a,d) cycloheptadien-5-yl] aminoundecanol, M.P. of its hydrochloride 120° C inst. (acetonitrile), starting from 5-chloro-dibenzo (a,d) cycloheptadiene and 11-aminoundecanol.

In a similar manner, 2,5-dichloro-dibenzo (a,d) cycloheptadiene was reacted with ω-aminoalkanols having from 4 to 11 carbon atoms inclusive to produce the corresponding ω-[2-chloro-dibenzo (a,d) cycloheptadien-5-yl] aminoalkanols ; 5-chloro-8-fluoro-dibenzo (a,d) cycloheptadiene was reacted with ω-aminoalkanols having from 4 to 11 carbon atoms inclusive to produce the corresponding ω-[8-fluoro-dibenzo (a,d) cycloheptadien-5-yl] aminoalkanols ; 3-bromo-5-chloro-dibenzo (a,d) cycloheptadiene was reacted with ω-aminoalkanols having from 4 to 11 carbon atoms inclusive to produce the corresponding ω-[3-bromo-dibenzo (a,d) cycloheptadien-5-yl] aminoalkanols.

Furthermore by using 5-chloro-dibenzo (a,d) cycloheptatriene, 11-chloro dibenzo (b,e) oxepine, and 11-chloro-dibenzo (b,e) thiepine, each optionally halosubstituted, instead of 5-chloro-dibenzo (a,d) cycloheptadiene, the corresponding ω-[dibenzo (a,d) cycloheptatrien-5-yl] amino alkanols, ω-[dibenzo (b,e) oxepin-11-yl] aminoalkanols and ω-[dibenzo (b,e) thiepin-11-yl] aminoalkanols, and the corresponding halo-substituted compounds were respectively produced.

5. dl 4-[8-chloro-10,10-dioxo-11-methyl-dibenzo (c,f) thiazepin (1,2)-5-yl] amino-butanol, M.P. of its hydrochloride 160° C inst. with decomposition (ethyl methyl ketone/water), starting from 5,8-dichloro-10,10-dioxo-11-methyldibenzo (c,f) thiazepine (1,2) and 4-aminobutanol.

6. dl 7-[8-chloro-10,10-dioxo-11-methyl-dibenzo (c,f) thiazepin (1,2)-5-yl] amino heptanol, M.P. of its hydrochloride 190° C inst. with decomposition, (ethanol), starting from 5,8-dichloro-10,10-dioxo-11-methyl-dibenzo (c,f) thiazepine (1,2) and 7-amino-heptanol.

In a similar manner, 5-chloro-10, 10-dioxo-11-alkyl dibenzo (c,f) thiazepines (1,2) wherein alkyl is ethyl, propyl, isopropyl, butyl, isobutyl, sec.-butyl, tert.-butyl or pentyl, optionally halo-substituted in 1, 2, 3, 4, 6, 7, 8 or 9 position, were reacted with ω-aminoalkanols having from 4 to 11 carbon atoms inclusive to produce the corresponding ω-[10,10-dioxo-11-alkyldibenzo (c,f) thiazepin (1,2)-5-yl] amino-alkanols and optionally the corresponding halo-substituted compounds.

The new compounds of the general formula I and physiologically tolerable salts thereof possess valuable pharmacological and therapeutic properties, especially psychostimulant, antidepressant and analgesic activity.

Their toxicity is low and the $LD_{50}$ studied in mice varies from 130 to 500 mg/kg by the intraperitoneal route and from 500 to 1,300 mg/kg by the oral route.

The stimulant activity on the central nervous system was demonstrated by actography in mice. The new compounds, when administered at doses of 50 mg/kg P.O., increase the number of moving of the animals by from 30 to 776 % in comparison with untreated animals.

The analgesic activity was studied by the method of Woolf G. and Mac Donald A.D. (J. Pharm. 80, 300 (1944)). It was found that the compounds of the invention, administered in mice by oral route at the dose of 50 mg/kg, increase the threshold of pain perception from 20 to 60 %.

The here-above described properties, as well as the low toxicity, allow the use of the new compounds in therapy, especially as psychostimulant, antidepressant and analgesic.

The present invention also includes pharmaceutical compositions for oral, rectal or parenteral administration, containing a compound of the general formula I or a physiologically tolerable salt thereof, in admixture or conjonction with a suitable pharmaceutical carrier, such, for example, as distilled water, glucose, lactose, talc, starch, magnesium stearate and cocoa butter. Doses may vary from 20 to 200 mg 1 to 5 times a day.

We claim:

1. A compound selected from the group consisting of
   a. 7-[dibenzo (a,d) cycloheptadien-5-yl] amino heptanol, dl-7-[8-chloro-10,10-dioxo-11-methyl dibenzo (c,f) thiazepin (1,2)-5-yl] amino heptanol, 11-[dibenzo (a,d) cycloheptadien-5-yl] amino undecanol; and
   b. the hydrochloric acid addition salts thereof.

2. A compound of claim 1 wherein the compound is 11-[dibenzo (a,d) cycloheptadien-5-yl] aminoundecanol.

3. A compound of claim 2, in the form of its hydrochloride.

4. A compound of claim 1 which is 7-[dibenzo (a,d) cycloheptadien-5-yl] aminoheptanol.

5. A compound of claim 4 in the form of its hydrochloride.

6. A compound of claim 1 which is dl 7-[8-chloro-10,10-dioxo-11-methyl-dibenzo (c,f) thiazepin (1,2)-5-yl] aminoheptanol.

7. A compound of claim 6 in the form of its hydrochloride.

* * * * *

UNITED STATES PATENT OFFICE
CERTIFICATE OF CORRECTION

Patent No. 3,872,102      Dated  March 18, 1975

Inventor(s) Charles MALEN, Monique DESNOS, and Jean-Claude POIGNANT

It is certified that error appears in the above-identified patent and that said Letters Patent are hereby corrected as shown below:

[54] TRICYCLIC COMPOUNDS OF ALIPHATIC ω-AMINO ALCOHOLS

[75] Inventors: Charles Malen, Fresnes; Monique Desnos, Issy-Les-Mouleneaux; Jean-Claude Poignant, Wissous, all of France Col. 1, line 19: "10 to 5 carbon atoms" should read -- 1 to 5 carbon atoms--.

Signed and Sealed this second Day of September 1975

[SEAL]

Attest:

RUTH C. MASON
Attesting Officer

C. MARSHALL DANN
Commissioner of Patents and Trademarks